United States Patent
Albero et al.

(10) Patent No.: US 12,537,803 B2
(45) Date of Patent: Jan. 27, 2026

(54) USING TONAL BITS FOR SECURE MESSAGING

(71) Applicant: Bank of America Corporation, Charlotte, NC (US)

(72) Inventors: George Albero, Charlotte, NC (US); Olga Kocharyan, Matthews, NC (US); Stephen C. Brown, Charlotte, NC (US); Elijah Clark, Charlotte, NC (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 173 days.

(21) Appl. No.: 18/374,761

(22) Filed: Sep. 29, 2023

(65) Prior Publication Data
US 2025/0112899 A1    Apr. 3, 2025

(51) Int. Cl.
*H04L 9/40* (2022.01)
*G06N 5/022* (2023.01)

(52) U.S. Cl.
CPC ......... *H04L 63/0428* (2013.01); *G06N 5/022* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 9,305,559 B2 | 4/2016 | Sharma et al. | |
| 10,764,230 B2 | 9/2020 | Lord | |
| 11,012,757 B1 | 5/2021 | Nielsen | |
| 11,483,143 B2* | 10/2022 | Tola | H04L 9/50 |
| 11,722,524 B2* | 8/2023 | Chin | H04L 63/20 726/25 |
| 11,863,566 B2* | 1/2024 | Adams | H04L 63/0236 |
| 12,120,216 B2* | 10/2024 | Brochonski | H04L 9/008 |
| 2009/0080830 A1* | 3/2009 | Matsuoka | G02B 6/43 385/14 |
| 2009/0125310 A1 | 5/2009 | Lee et al. | |
| 2011/0243327 A1 | 10/2011 | Strein | |
| 2011/0264455 A1 | 10/2011 | Nelson et al. | |
| 2012/0277893 A1 | 11/2012 | Davis et al. | |
| 2013/0171926 A1 | 7/2013 | Perret et al. | |
| 2013/0272672 A1 | 10/2013 | Padro Rondon et al. | |
| 2014/0105448 A1 | 4/2014 | Srinivasan et al. | |
| 2014/0222438 A1 | 8/2014 | Courtney, III et al. | |

(Continued)

*Primary Examiner* — Dant B Shaifer Harriman
(74) *Attorney, Agent, or Firm* — Banner & Witcoff, Ltd.

(57) ABSTRACT

A computing platform may receive an event processing request. The computing platform may identify, by inputting first communication parameters of the event processing request into a secure communication model, communication validation information for the event processing request. The computing platform may embed, using one or more tonal bits of an audio communication corresponding to the event processing request, the first communication validation information, wherein embedding the first communication validation information generates a secure event communication. The computing platform may send the secure event communication to a recipient user device, where the recipient user device may be configured to verify the secure event communication based on the first communication validation information.

19 Claims, 8 Drawing Sheets

(56) References Cited

U.S. PATENT DOCUMENTS

| | | |
|---|---|---|
| 2016/0210971 A1 | 7/2016 | Adsumilli |
| 2016/0358614 A1 | 12/2016 | Phielipp |
| 2017/0263258 A1 | 9/2017 | Reitz et al. |
| 2020/0098379 A1 | 3/2020 | Tai et al. |
| 2020/0098380 A1 | 3/2020 | Tai et al. |
| 2021/0037000 A1* | 2/2021 | Attard ............... G06N 20/00 |
| 2022/0200973 A1* | 6/2022 | Tola ................ H04L 9/3013 |
| 2022/0406317 A1 | 12/2022 | Tu et al. |
| 2022/0415333 A1 | 12/2022 | Zhu et al. |
| 2023/0043229 A1* | 2/2023 | Tola ................ H04L 9/0841 |
| 2023/0162743 A1 | 5/2023 | Brown et al. |
| 2023/0238008 A1 | 7/2023 | Gao et al. |
| 2024/0169256 A1* | 5/2024 | Gong ............... G06N 3/0985 |
| 2025/0080506 A1* | 3/2025 | Marlin ............. H04L 63/0421 |
| 2025/0260565 A1* | 8/2025 | Abdelsamie ........ H04L 9/3239 |

* cited by examiner

Payment Confirmation Interface

Please scan the quick response (QR) code below to confirm the payment.

[QR Code]

FIG. 4

USING TONAL BITS FOR SECURE MESSAGING

BACKGROUND

In some instances, messages and/or other communications sent over the Internet may be vulnerable to interception (and/or otherwise intercepted) by bad actors. In instances where such communications include sensitive information, this may be especially problematic. It may thus be important to improve methods by which such communications are sent, protected, and verified, to both minimize the likelihood of interception, and to avoid the leakage of sensitive information in the event that such communications are intercepted.

SUMMARY

Aspects of the disclosure provide effective, efficient, scalable, and convenient technical solutions that address and overcome the technical problems associated with securing electronic communications. In one or more instances, a computing platform having at least one processor, a communication interface, and memory may train, using historical communication parameters and corresponding communication validation information, a secure communication model, which may configure the secure communication model to output communication validation information. The computing platform may receive an event processing request. The computing platform may identify, by inputting first communication parameters of the event processing request into the secure communication model, first communication validation information for the event processing request. The computing platform may embed, using one or more tonal bits of an audio communication corresponding to the event processing request, the first communication validation information, which may generate a secure event communication. The computing platform may send the secure event communication to a recipient user device, which may be configured to verify the secure event communication based on the first communication validation information.

In one or more instances, the first communication validation information may include one of: a piece of a song, an audio tone, an audio note, an audio pitch, or a sound. In one or more instances, embedding the first communication validation information may include embedding, using one or more of: an audible frequency of the secure event communication or an inaudible frequency of the secure event communication, the first communication validation information.

In one or more examples, embedding the first communication validation information may include embedding, across a plurality of frequencies of the secure event communication and using frequency domain multiplexing, the first communication validation information. In one or more examples, embedding the first communication validation information may include embedding, at different times throughout a duration of the secure event communication and using time domain multiplexing, the first communication validation information.

In one or more instances, the computing platform may encrypt the secure event communication prior to sending the secure event communication to the recipient user device. In one or more instances, sending the secure event communication to the recipient user device may include sending the secure event communication to the recipient user device via at least one intermediary waypoint.

In one or more examples, the at least one intermediary waypoint may be configured to modify the secure event communication, by performing one or more of: modifying the first communication validation information, modifying a location of the first communication validation information within the secure event communication, where the location may include one or more of: a time or a frequency, and modifying encryption of the first communication validation information. In one or more examples, identifying the first communication validation information further may include identifying the modification by the at least one intermediary waypoint. In one or more instances, the at least one intermediary waypoint may be configured to verify the secure event communication prior to routing the secure event communication to the recipient user device. In one or more instances, the at least one intermediary waypoint may be configured to: 1) detect interference with the secure event communication, 2) identify, by inputting the interference into an interference response model, one or more response actions; and 3) initiate the one or more response actions.

In one or more examples, the interference response model may be hosted at the computing platform, and initiating the one or more response actions may include initiating, in response to one or more commands from the computing platform, the one or more response actions. In one or more examples, the one or more response actions comprise one or more of: 1) sending a notification to an initiator of the event processing request, 2) modifying a path of the secure event communication to include one or more alternative intermediary waypoints, 3) blocking transmission of the secure event communication, or 4) generating an updated secure event communication that includes second communication validation information, which may be embedded at a different frequency and corresponds to a different level of security.

In one or more instances, the at least one intermediary waypoint may be configured to convert the secure event communication to a quick response (QR) code, and the recipient user device may be configured with an application configured to validate the QR code. In one or more instances, the computing platform may send, to the recipient user device, the first communication validation information and a location, within the secure event communication, of the first communication validation information, where the recipient user device may be configured to verify the secure event communication by identifying, at the location and within the secure event communication, the first communication validation information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for securing messages (such as payment messages) through tonal bits are described herein. For example, the system may generate a tonal representation of anything in a payment package (e.g., 1=A sharp, or the like). The system may perform orthogonal frequency division multiplexing that breaks up payments into microbits. Alternatively, instead of generating a tone, a tone may represent a number at a specific point in time. In some instances, frequency hopping may be used to prevent tracking by bad actors.

In some instances, waypoints may be used to recreate tonal messages.

As a particular use case, a customer may submit a payment. Instead of submitting the payment through the internet, the payment message may be converted to the audio spectrum (using microbits, or the like). In some instances, infrasonic waves (e.g., going through the earth) may be used above audio frequencies. In some instances, this may happen within a network, and those outside the network would not know the pattern or code.

In some instances, a pre-loaded library of a tonal generator may be used. Additionally or alternatively, artificial intelligence may be used to create songs that may be unique to the user.

Based on a size of the payment, a value may be attached to the payment. Based on the corresponding value, different lengths of audio and/or combinations of songs may be used.

In some instances, quantum computing may be used to check for disparity between what was sent and received. In some instances, these processes need not be limited to a computer processing unit (CPU), rather the load may be placed on and/or otherwise shared with a graphics processing unit (GPU).

In some instances, one or more levels of frequency division multiplexing may be used to embed signals across various frequencies, bandwidths, or the like. In some instances, random frequency switching may also be performed. In some instances, frequency domain multiplexing may be interspersed and/or otherwise randomized with time domain multiplexing.

Figure 1A:
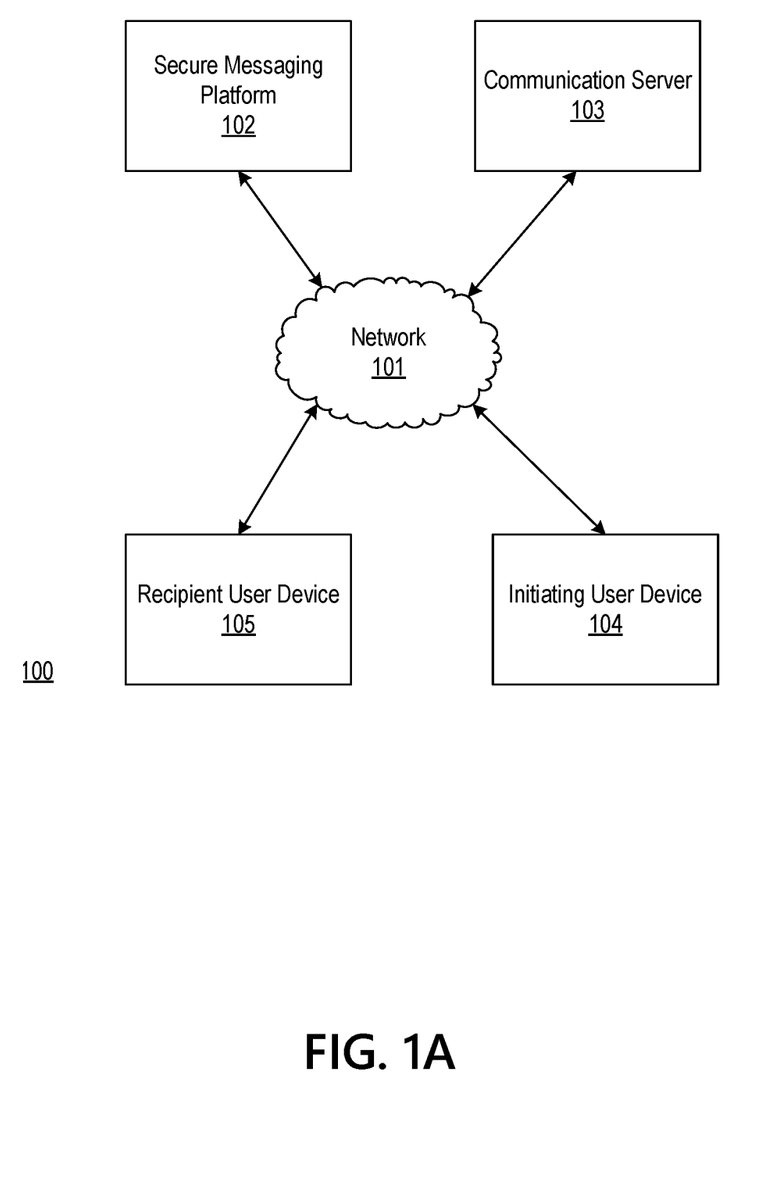
FIGS. 1A-1B depict an illustrative computing environment for securing messages using tonal bits in accordance with one or more example embodiments.
Figure 1B:
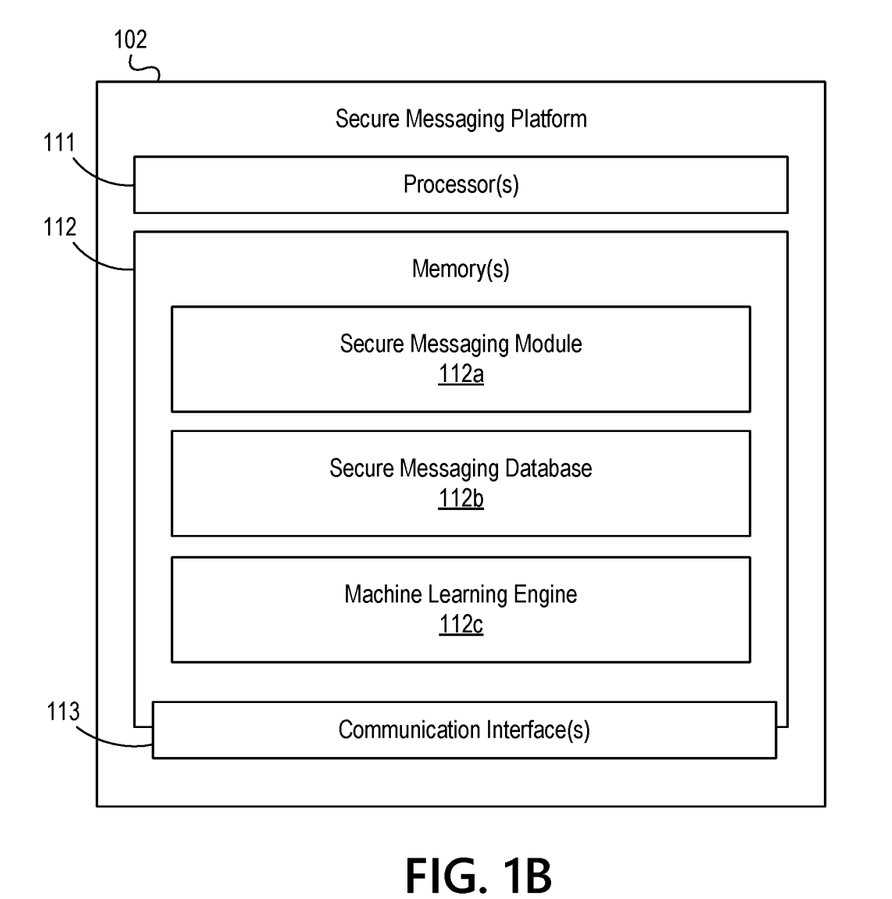

FIGS. 1A-1B depict an illustrative computing environment for securing messages using tonal bits in accordance with one or more example embodiments. Referring to FIG. 1A, computing environment 100 may include one or more computer systems. For example, computing environment 100 may include secure messaging platform 102, communication server 103, initiating user device 104, and recipient user device 105.

As described further below, secure messaging platform 102 may be a computer system that includes one or more computing devices (e.g., servers, server blades, or the like) and/or other computer components (e.g., processors, memories, communication interfaces) that may be used to provide message authentication services using tonal bits. For example, secure messaging platform 102 may be configured to embed verification information into audio signals corresponding to messages, which may, e.g., be used to verify such messages accordingly. In some instances, the secure messaging platform 102 may be configured to host one or more machine learning models, which may, e.g., be used to generate the verification information, identify a method by which it should be embedded, identify response actions, and/or perform other actions.

Communication server 103 may be a computer system that includes one or more computing devices (e.g., servers, server blades, or the like) and/or other computer components (e.g., processors, memories, communication interfaces) that may be used to route messages between the secure messaging platform 102 and an intended recipient. For example, the communication server 103 may be an intermediary server along a communication path. In some instances, the communication server 103 may be configured to modify communications (e.g., include verification information, a location of the verification information, an encryption scheme, and/or otherwise). In some instances the communication server 103 may be configured to analyze communications and/or identify interference, and to take response actions accordingly. In some instances, the communication server 103 may be configured to perform actions described herein as being performed by the secure messaging platform 102.

Initiating user device 104 may be and/or otherwise include a laptop computer, desktop computer, mobile device, tablet, smartphone, and/or other device that may be used by an individual (e.g., to send messages, such as payment messages). In some instances, initiating user device 104 may be configured to display one or more user interfaces (e.g., payment initiating notifications, or the like).

Recipient user device 105 may be and/or otherwise include a laptop computer, desktop computer, mobile device, tablet, smartphone, and/or other device that may be used by an individual (e.g., to receive messages, such as payment messages). In some instances, recipient user device 105 may be configured to display one or more user interfaces (e.g., payment confirmation interfaces, or the like).

Although a communication server 103 and two user devices (initiating user device 104 and recipient user device 105) are shown, any number of such devices may be deployed in the systems/methods described below without departing from the scope of the disclosure.

Computing environment 100 also may include one or more networks, which may interconnect secure messaging platform 102, communication server 103, initiating user device 104, recipient user device 105, or the like. For example, computing environment 100 may include a network 101 (which may interconnect, e.g., secure messaging platform 102, communication server 103, initiating user device 104, recipient user device 105, or the like).

In one or more arrangements, secure messaging platform 102, communication server 103, initiating user device 104, and/or recipient user device 105, may be any type of computing device capable of sending and/or receiving requests and processing the requests accordingly. For example, secure messaging platform 102, communication server 103, initiating user device 104, and/or recipient user device 105 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of secure messaging platform 102, communication server 103, initiating user device 104, and/or recipient user device 105 may, in some instances, be special-purpose computing devices configured to perform specific functions.

Referring to FIG. 1B, secure messaging platform 102 may include one or more processors 111, memory 112, and communication interface 113. A data bus may interconnect processor 111, memory 112, and communication interface 113. Communication interface 113 may be a network interface configured to support communication between secure messaging platform 102 and one or more networks (e.g., network 101, or the like). Memory 112 may include one or more program modules having instructions that when executed by processor 111 cause secure messaging platform 102 to perform one or more functions described herein and/or one or more databases that may store and/or otherwise maintain information which may be used by such program modules and/or processor 111. In some instances, the one or more program modules and/or databases may be stored by and/or maintained in different memory units of secure messaging platform 102 and/or by different computing devices that may form and/or otherwise make up secure messaging platform 102. For example, memory 112 may have, host, store, and/or include secure messaging module 112a, secure messaging database 112b, and/or machine learning engine 112c.

Secure messaging module 112a may have instructions that direct and/or cause secure messaging platform 102 to provide improved message security and/or verification techniques, as discussed in greater detail below. Secure messaging database 112b may store information used by secure messaging module 112a and/or secure messaging platform 102 in application of advanced techniques to provide improved message security and/or verification, and/or in performing other functions. Machine learning engine 112c may be configured to train, host, and/or otherwise maintain one or more machine learning models that may be used by the secure messaging module 112a and/or secure messaging platform 102 to provide improved message security and/or verification.

Figure 2A:
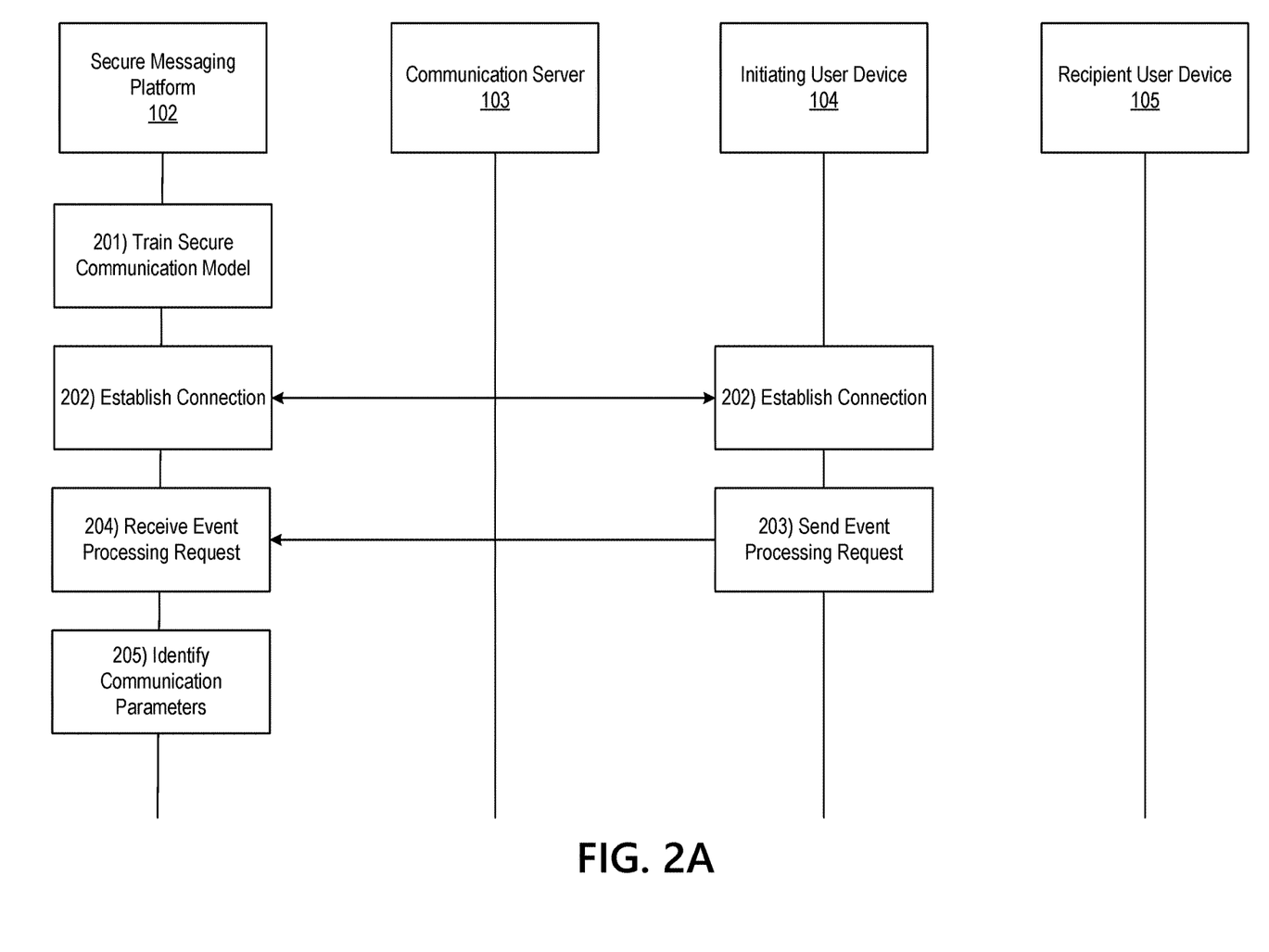
FIGS. 2A-2D depict an illustrative event sequence for securing messages using tonal bits in accordance with one or more example embodiments.

FIGS. 2A-2D depict an illustrative event sequence for securing messages using tonal bits in accordance with one or more example embodiments. Referring to FIG. 2A, at step 201, the secure messaging platform 102 may train a machine learning model (e.g., a secure communication model). For example, the secure messaging platform 102 may train the secure communication model to identify communication validation information (e.g., a piece of a song, an audio tone, an audio note, an audio pitch, a sound or the like) and communication parameters for a given secure event communication (e.g., one or more frequencies at which to embed the communication validation information, one or more times at which to embed the communication validation information, a number of intermediary waypoints through which the secure event communication should be transported en route to a recipient device, a number of intermediary waypoints that should modify the secure event communication en route to a recipient device, ways in which the intermediary waypoints should modify the secure event communication, and/or other information). For example, the secure messaging platform 102 may receive historical event processing information (e.g., payment amounts, transaction values, account information, and/or other information), communication validation information, communication parameters, and/or other information. The secure messaging platform 102 may input the historical information into the secure communication model to train the secure communication model to establish stored correlations between the communication parameters/communication validation information and various event processing requests. In doing so, the secure messaging platform 102 may train the secure communication model to identify, based on an event processing request, communication validation information and/or communication parameters (which may, e.g., be used to secure and/or otherwise validate communications).

In some instances, the secure messaging platform 102 may establish one or more thresholds, which may e.g., define threshold ranges corresponding to the value of event processing requests (e.g., a payment value, or the like). In these instances, the secure messaging platform 102 may train the secure communication model to associate communication parameters with each corresponding range. For example, the secure communication model may be trained to identify whether an event processing request is associated with a first, second, or third range, each increasing in value. The secure communication model may be trained to route requests in the first range directly to an intended recipient, route requests in the second range to the intended recipient via one or more waypoints, and route requests in the third range to the intended recipient via one or more waypoints, where the request is modified at the one or more waypoints (as is described further below). In doing so, the secure communication model may cause increased levels of security and/or validation to be applied as communications increase in value.

In some instances, in training the secure communication model, the secure messaging platform 102 may train a supervised learning model (e.g., decision tree, bagging, boosting, random forest, neural network, linear regression, artificial neural network, support vector machine, and/or other supervised learning model), unsupervised learning model (e.g., classification, clustering, anomaly detection, feature engineering, feature learning, and/or other unsupervised learning models), and/or other model.

At step 202, the initiating user device 104 may establish a connection with the secure messaging platform 102. For example, the initiating user device 104 may establish a first wireless data connection with the secure messaging platform 102 to link the initiating user device 104 with the secure messaging platform 102 (e.g., in preparation for sending event processing requests). In some instances, the initiating user device 104 may identify whether a connection is already established with the secure messaging platform 102. If a connection is already established with the secure messaging platform 102, the initiating user device 104 might not re-establish the connection. If a connection is not yet established with the secure messaging platform 102, the initiating user device 104 may establish the first wireless data connection as described herein.

At step 203, the initiating user device 104 may send an event processing request to the secure messaging platform 102. For example, the initiating user device 104 may send request to initiate a payment, or the like. In some instances, the initiating user device 104 may send the event processing request to the secure messaging platform 102 while the first wireless data connection is established.

At step 204, the secure messaging platform 102 may receive the event processing request sent at step 203. In some instances, the secure messaging platform 102 may receive the event processing request via the communication interface 113 while the first wireless data connection is established.

At step 205, secure messaging platform 102 may identify/generate communication parameters. For example, the secure messaging platform 102 may input information of event processing request (such as a corresponding value of the requested transaction, account information, or the like) to the secure communication model. For example, the secure messaging platform 102 may input the value of the event processing request into the secure communication model, which may identify a corresponding threshold range into which the value of the event processing request falls, and to identify communication parameters accordingly. For example, the secure communication model may output that the event processing request may be directly sent to the recipient user device. Additionally or alternatively, the secure communication model may output that the event processing request should be routed, as a secure event communication, via one or more intervening waypoints (such as communication server 103), where at least one of the waypoints modifies the secure event communication en route to the recipient device. Additionally or alternatively, the secure communication model may output that the event processing request should be routed, as a secure event communication, via one or more intervening waypoints, and multiple waypoints should be used to modify the secure event communication. Accordingly, the secure messaging platform 102 may dynamically adjust security parameters for the secure event communication accordingly.

In addition to identifying the communication parameters (e.g., the path across which the secure event communication should be sent and if or how it should be modified along the way), the secure communication model may output communication validation information (which may, e.g., be an audio signal such as a piece of a song, an audio tone, an audio note, an audio pitch, or a sound), which may, e.g., be embedded in the secure event communication. In some instances, secure communication model may dynamically adjust a complexity of the communication validation information in a similar way as discussed above with regard to the communication parameters and the corresponding threshold ranges. For example, the secure communication model may be configured to initially randomly produce communication validation information and then adjust its complexity (e.g., a duration of the sound, a number of notes, a number of frequencies or points in time across which the communication validation information is spread, or the like).

Figure 2B:
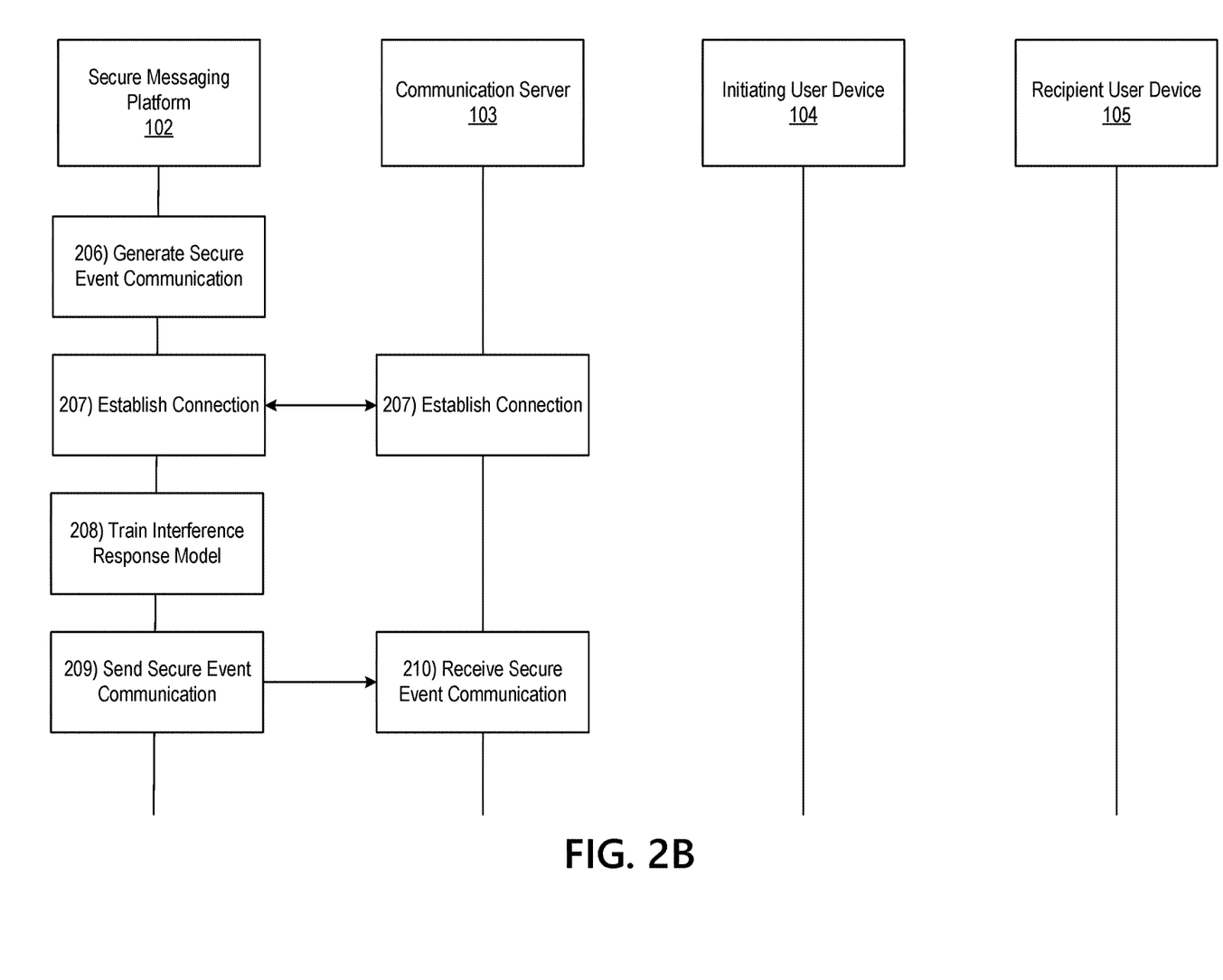

Referring to FIG. 2B, at step 206, the secure messaging platform 102 may generate the secure event communication by embedding the communication validation information into one or more bits of an audio signal according to the communication parameters. For example, the secure messaging platform 102 may generate the secure event communication using time domain multiplexing, where the communication validation information may be divided across different moments in time across an audio signal. Additionally or alternatively, the secure messaging platform 102 may generate the secure event communication using frequency domain multiplexing, where the communication validation information is divided across different frequencies and/or frequency bands of an audio signal. In some instances, the secure messaging platform 102 may embed the communication validation information within the secure event communication at a particular frequency (which may, in some instances, be an audible or inaudible frequency) or time.

In some instances, the secure messaging platform 102 may encrypt the secure event communication.

In some instances, the secure messaging platform 102 may generate white noise and/or otherwise embed decoy information in the secure event communication at one or more times or frequencies different than those at which the legitimate communication validation information is embedded. This may, in some instances, assist in hiding and/or otherwise concealing the communication validation information.

In some instances, in generating the secure event communication, the secure messaging platform 102 may select a song, and a particular tone corresponding to the song at a given time may comprise the communication validation information. In some instances, the tone may be selected based on the available tones in a given song.

At step 207, the secure messaging platform 102 may establish a connection with the communication server 103 (which may, e.g., be identified as part of the communication parameters at step 205). For example, the secure messaging platform 102 may establish a second wireless data connection with the communication server 103 to link the secure messaging platform 102 with the communication server 103 (e.g., in preparation for sending secure event communications).

In some instances, the secure messaging platform 102 may identify whether or not a connection is already established with the communication server 103. If a connection is already established with the communication server 103, the secure messaging platform 102 might not re-establish the connection. If a connection is not yet established with the communication server 103, the secure messaging platform 102 may establish the second wireless data connection as described herein.

At step 208, the secure messaging platform 102 may train a machine learning model (e.g., an interference response model). For example, the secure messaging platform 102 may train the interference response model to identify response actions (e.g., change a path of secure event communications, change a frequency or frequency band at which the communication validation information is embedded, change a time or times at which the communication validation information is embedded, adjust a complexity of the communication parameters, resend the communication, and/or other actions) for detected interference (e.g., interference detected with a secure event communication at one or more waypoints and/or otherwise during transmission). For example, the secure messaging platform 102 may receive historical interference information (e.g., where was the interference, what was the interference, or the like), and corresponding response actions. The secure messaging platform 102 may then input this historical information into the interference model to train the interference model to establish stored correlations between types of interference and the corresponding response actions. In doing so, the secure messaging platform 102 may train the interference model to identify, based on detected interference, corresponding response actions, which may, e.g., be used to further secure communications.

In some instances, in training the interference response model, the secure messaging platform 102 may train a supervised learning model (e.g., decision tree, bagging, boosting, random forest, neural network, linear regression, artificial neural network, support vector machine, and/or other supervised learning model), unsupervised learning model (e.g., classification, clustering, anomaly detection, feature engineering, feature learning, and/or other unsupervised learning models), and/or other model.

At step 209, the secure messaging platform 102 may send the secure event communication to the communication server 103 (e.g., which may, e.g., be an intervening waypoint as discussed above). For example, the secure messaging platform 102 may send the secure event communication to the communication server 103 via the communication interface 113 and while the second wireless data connection is established.

At step 210, the communication server 103 may receive the secure event communication sent at step 209. For example, the communication server 103 may receive the secure event communication while the second wireless data connection is established.

Figure 2C:
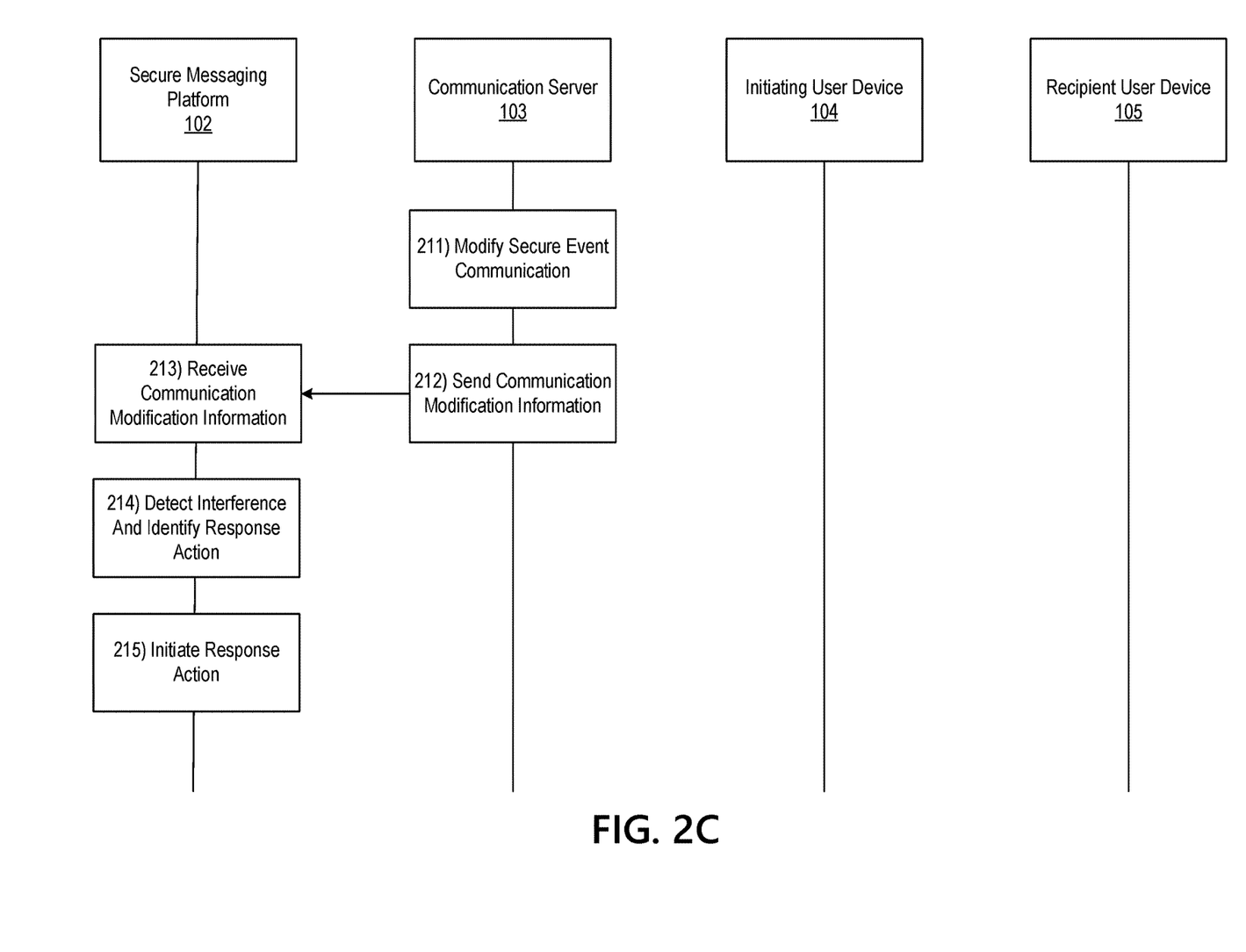

Referring to FIG. 2C, at step 211, the communication server 103 may, in some instances, modify the secure event communication. For example, in some instances, the communication server 103 may modify the communication validation information, one or more frequencies at which the communication validation information is embedded, one or more times at which the communication validation information is embedded, encryption of the secure event communication, or the like. In some instances, the communication server 103 may modify the secure event communication based on one or more commands form the secure messaging platform 102 (which may, in some instances, be sent along with the secure event communication). Additionally or alternatively, the communication server 103 may itself be configured with an instance of the secure communication model trained at step 201, and may know whether or not to modify (and how to modify) the secure event communication based on its corresponding value accordingly. In some instances, any modifications to the secure event communication, made by the communication server 103, may be tracked (e.g., by the secure messaging platform 102, or the like) and/or otherwise communicated to the recipient user device 105. In doing so, the recipient user device 105 may be configured to validate the secure event communication against a known truth value and/or otherwise identify a location of any embedded communication validation information despite any modifications performed by intermediary communication servers along a path of the secure event communication.

At step 212, the communication server 103 may send communication modification information to the secure messaging platform 102, which may, e.g., indicate interference with the secure event communication at the communication server 103 (e.g., attempts to access the communication, or the like). In some instances, the communication server 103 may send the communication modification information to the secure messaging platform 102 while the second wireless data connection is established.

At step 213, the secure messaging platform 102 may receive the communication modification information sent at step 212. For example, the secure messaging platform 102 may receive the communication modification information via the communication interface 113 and while the second wireless data connection is established.

At step 214, the secure messaging platform 102 may detect, based on the communication modification information received at step 213, interference with the secure event communication, and may identify corresponding response actions. For example, the secure messaging platform 102 may detect an attempt to intercept the secure event communication, access the secure event communication, and/or otherwise affect airwaves corresponding to the secure event communication.

In some instances, the secure messaging platform 102 may identify one or more response actions. For example, the secure messaging platform 102 may input information of the interference into the interference response model (trained at step 208), which may identify corresponding response actions. For example, the interference response model may output that the secure messaging platform 102 should perform one or more of: change a path of the secure event communication (e.g., route to the recipient user device 105 via one or more alternative intervening waypoints), change a frequency (or frequencies) or frequency band (or bands) at which the communication validation information is embedded, change a time or times at which the communication validation information is embedded, adjust a complexity of the communication parameters (e.g., increase a number of intervening waypoints that may modify the secure event communication and/or the way in which they modify the secure event communication), resend the communication, and/or other actions.

In some instances, the secure messaging platform 102 may use the interference response model to track any detected interference, and may enable the secure messaging platform 102 to apply any stored intelligence in the future routing of secure event communications (e.g., avoiding a compromised waypoint in the future, or the like).

At step 215, the secure messaging platform 102 may initiate the one or more response actions identified at step 214. For example, the secure messaging platform 102 may change a path of the secure event communication (e.g., route to the recipient user device 105 via one or more alternative intervening waypoints), change a frequency (or frequencies) or frequency band (or bands) at which the communication validation information is embedded, change a time or times at which the communication validation information is embedded, adjust a complexity of the communication parameters (e.g., increase a number of intervening waypoints that may modify the secure event communication and/or the way in which they modify the secure event communication), resend the communication, and/or perform other actions. Although steps 212-215 indicate communication of the communication server 103 with the secure messaging platform 102 and determination/implementation of the response actions by the secure messaging platform 102 accordingly, in some instances, the communication server 103 itself may be configured to identify and/or initiate the response actions automatically. For example, in some instances, the communication server 103 may be configured with the interference response model, and may be configured to make go/no-go decisions (e.g., indicating whether or not the secure event communication should be routed to a subsequent waypoint and/or the recipient user device) based on detected interference. In some instances, the communication server 103 may be configured to check for secondary communication validation information if initial communication validation information is not detected. For example, the communication server 103 may be configured to check for the communication validation information at a second point in time if it is not detected at a first moment in time, or the like.

Figure 2D:
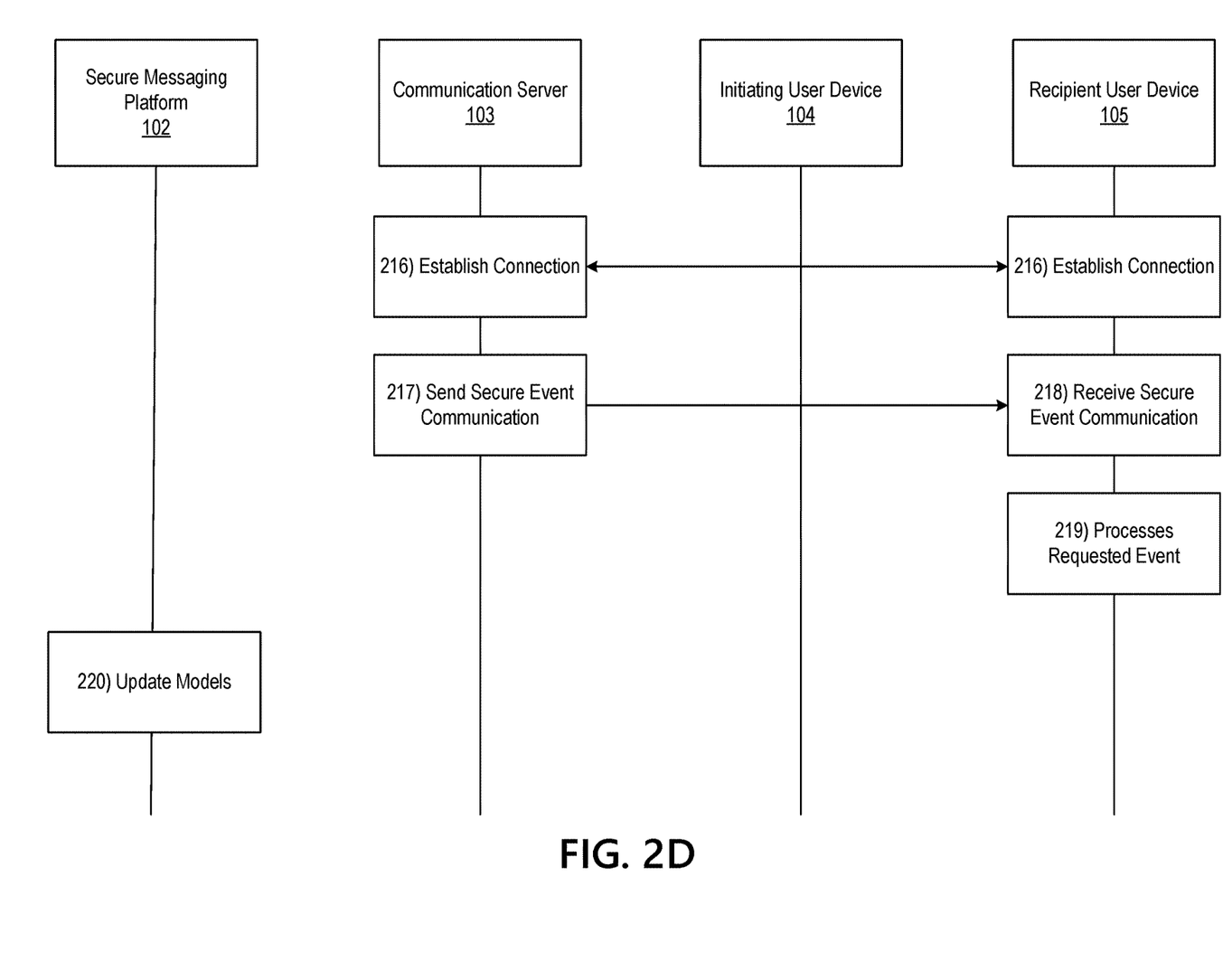

Referring to FIG. 2D, at step 216, the communication server 103 may establish a connection with the recipient user device 105. For example, the communication server 103 may establish a third wireless data connection with the recipient user device 105 to link the communication server 103 to the recipient user device 105 (e.g., in preparation for sending secure event communications). In some instances, the communication server 103 may identify whether or not a connection is already established with the recipient user device 105. If a connection is already established with the recipient user device 105, the communication server 103 might not re-establish the connection. If a connection is not yet established with the recipient user device 105, the communication server 103 may establish the third wireless data connection as described herein.

At step 217, the communication server 103 may send the secure event communication to the recipient user device 105. For example, the communication server 103 may send the secure event communication to the recipient user device 105 while the third wireless data connection is established. In some instances, in sending the secure event communication to the recipient user device 105, the communication server 103 may convert the secure event communication to a machine-readable code, such as a quick response (QR) code, and may send the QR code to the recipient user device 105.

At step 218, the recipient user device 105 may receive the secure event communication sent at step 217. For example, the recipient user device 105 may receive the secure event communication while the third wireless data connection is established.

At step 219, the recipient user device 105 may process the requested event. For example, the recipient user device 105 may process the payment and/or other request included in the secure event communication. In some instances, the recipient user device 105 may process the requested event based on validation of the secure event communication, which may include validation of the communication validation information. For example, the recipient user device 105 may have a known truth value for the communication validation information, which may, e.g., have been shared with the recipient user device 105 from the secure messaging platform 102. Additionally or alternatively, the recipient user device 105 may be informed of where to identify the communication validation information within the secure event communication (e.g., corresponding frequencies, times, or the like at which the communication validation information is embedded). In instances where the communication validation information and/or other aspects of the secure event communication are modified along with the path of the secure event communication, the recipient user device 105 may be notified of the modifications to enable the recipient user device 105 to properly validate the communication validation information and/or the secure event communication.

Figure 4:
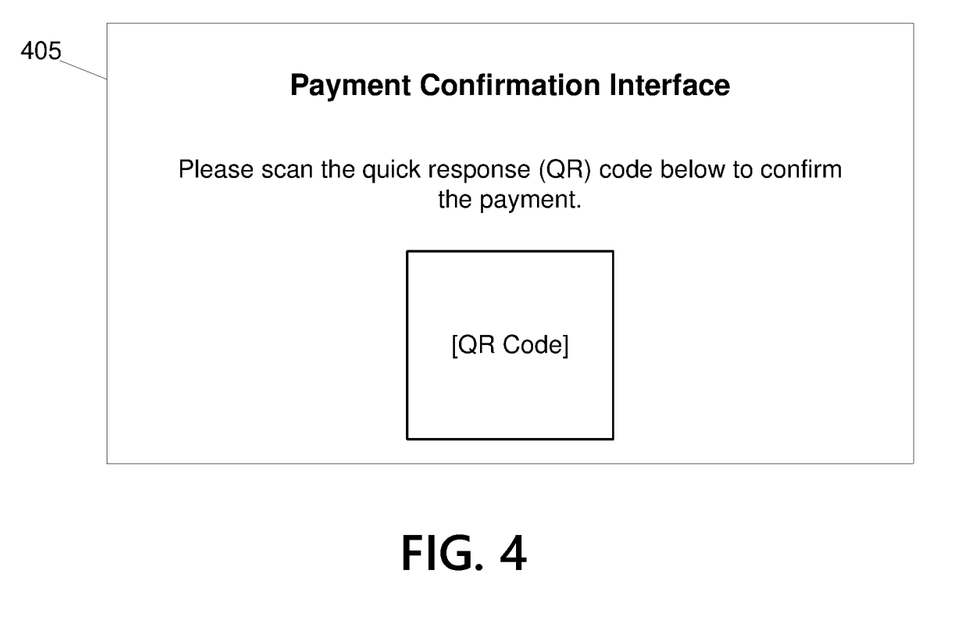
FIG. 4 depicts an illustrative user interface for securing messages using tonal bits in accordance with one or more example embodiments.

In instances where the secure event communication is converted to a QR code, the recipient user device 105 may validate the QR code by transferring the QR code into an application, executing at the recipient user device 105, which may be configured to validate the QR code. For example, the recipient user device 105 may display a graphical user interface similar to graphical user interface 405, which is illustrated in FIG. 4. Additionally or alternatively, the recipient user device 105 may be configured to capture an image of the QR code to perform the validation. In some instances, if the recipient user device 105 is not configured with the application to validate the QR code, the QR code and/or other information of the secure event communication may be sent to a kiosk, which may be configured with the application and accessible to a user of the recipient user device, and which may be configured to verify the secure event communication and process the requested event accordingly.

In some instances, the recipient user device 105 may validate the communication validation information by converting the communication validation information to a numeric value and comparing the numeric value against a known truth value (which may, e.g., have been previously received from the secure messaging platform 102, the communication server 103, and/or otherwise.

In instances where the recipient user device 105 validates the secure event communication, the recipient user device 105 may process the requested event (e.g., by communicating with an event processing server (e.g., a payment processing server, or the like). In some instances, an event processing confirmation notification, indicating that the requested event has been processed, may be sent to the secure messaging platform 102 and/or the initiating user device 104.

At step 220, the secure messaging platform 102 may update the secure communication model and/or the interference model based on the event processing request, the communication parameters, any detected interference, the response actions, user feedback information, and/or other information. In doing so, secure messaging platform 102 may continue to refine the secure communication model and/or interference response model using a dynamic feedback loop, which may, e.g., increase the accuracy and effectiveness of the models in securing and validating event processing requests.

For example, the secure messaging platform 102 may use the event processing request, the communication parameters, any detected interference, the response actions, user feedback information, and/or other information to reinforce, modify, and/or otherwise update the secure communication model and/or the interference response model, thus causing the models to continuously improve (e.g., in terms of securing and validating event processing requests).

For example, in some instances, the secure messaging platform 102 may update the secure communication model and/or interference response model to include new communication parameters and/or response actions, remove existing communication parameters and/or response actions, and/or otherwise modify the communication parameters and/or response actions for use in securing event processing requests In some instances, the secure messaging platform 102 may continuously refine the secure communication model and/or the interference response model. In some instances, the secure messaging platform 102 may maintain an accuracy threshold for the secure communication model and/or the interference response model, and may pause refinement (through the dynamic feedback loops) of the models if the corresponding accuracy is identified as greater than the corresponding accuracy threshold. Similarly, if the accuracy fails to be equal or less than the given accuracy threshold, the secure messaging platform 102 may resume refinement of the models through the corresponding dynamic feedback loop.

In doing so, subsequent communications may be secured by the secure communication model and/or interference response model by the prompt generation model based on any newly identified communication parameters and/or response actions, and thus message security may continuously improve.

Although a single intervening waypoint (e.g., communication server 103) is illustrated and described herein, any number of such intervening waypoints may be included in the methods described above without departing from the scope of the disclosure. Similarly, although analysis of the secure event communication is described with regard to the secure messaging platform 102, such analysis and the initiation of corresponding response actions may be performed by the communication server 103 without departing from the scope of the disclosure. Furthermore, although the above method is described primarily with regard to sending an electronic payment, this method may be applied to automated payments, wire transfers, and/or other use cases without departing from the scope of the disclosure. Furthermore, such payments may occur over any distance, including internationally, domestically, or even with as short as several feet away (e.g., conducting a transaction within a store, or the like).

Figure 3:
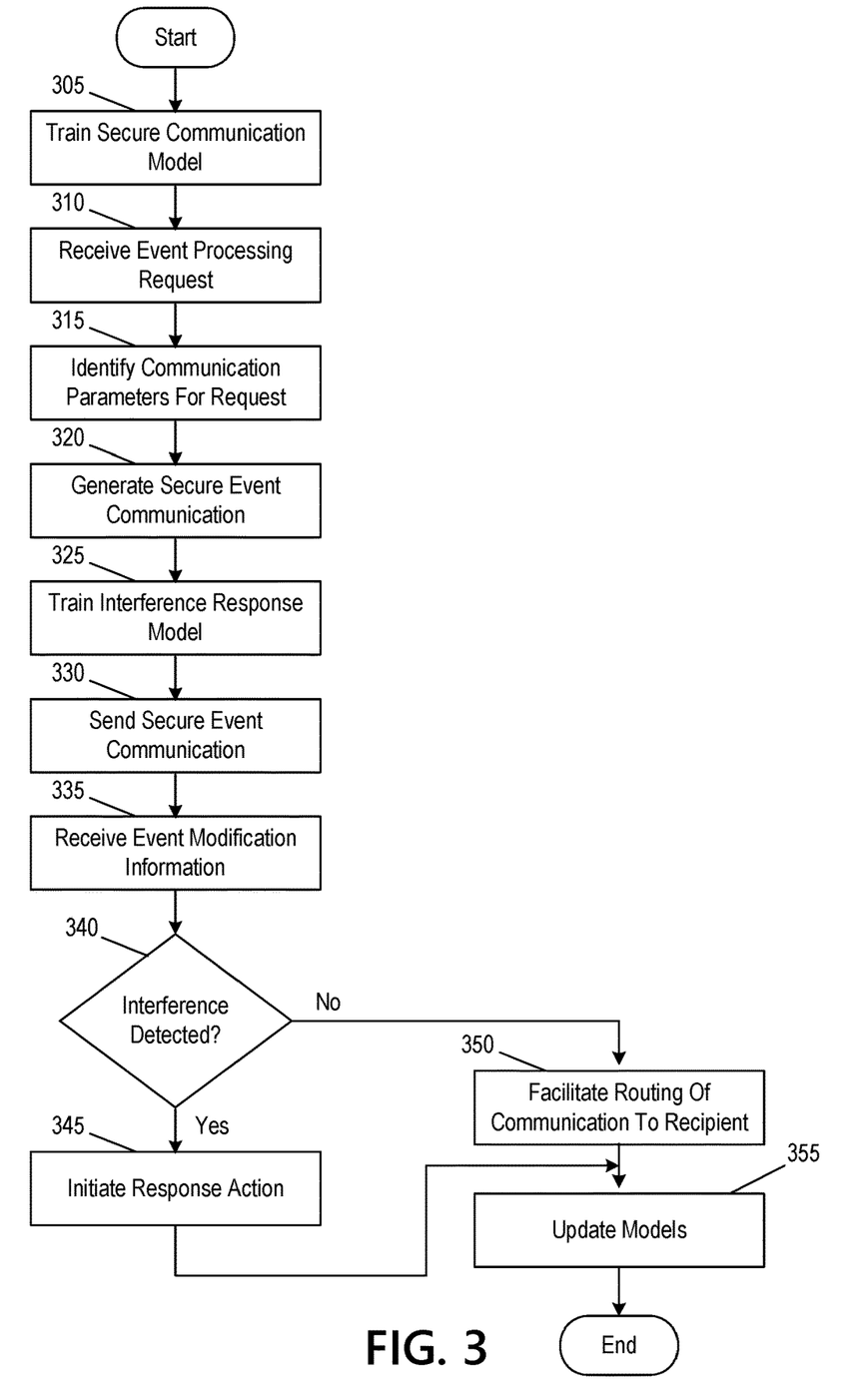
FIG. 3 depicts an illustrative method for securing messages using tonal bits in accordance with one or more example embodiments.

FIG. 3 depicts an illustrative method for securing messages using tonal bits in accordance with one or more example embodiments. At step 305, a computing platform having at least one processor, a communication interface, and memory may train a secure communication model. At step 310, the computing platform may receive an event processing request. At step 315, the computing platform may identify communication parameters for the event processing request. At step 320, the computing platform may generate a secure event communication by embedding communication validation information into the event processing request based on the communication parameters. At step 325, the computing platform may train an interference response model. At step 330, the computing platform may send a secure event communication based on the communication parameters. At step 335, the computing platform may receive event modification information. At step 340, the computing platform may identify whether or not the event modification information indicates interference with the secure event communication. If the computing platform does detect interference, the computing platform may proceed to step 345. At step 345, the computing platform may identify and initiate one or more response actions. At step 355, the computing platform may update the secure communication and/or interference response model.

Returning to step 340, if the computing platform identifies that no interference is detected, the computing platform may proceed to step 350. At step 350, the computing platform may facilitate routing of the secure event communication to the intended recipient. At step 355, the computing platform may update the secure communication and/or interference response model as described above.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
train, using historical communication parameters and corresponding communication validation information, a secure communication model, wherein training the secure communication model configures the secure communication model to output communication validation information;
receive an event processing request;

identify, by inputting first communication parameters of the event processing request into the secure communication model, first communication validation information for the event processing request, wherein the secure communication model:
   compares the first communication parameters to the historical communication parameters to identify matching historical parameters,
   identifies a stored correlation between the matching historical parameters and the first communication validation information, wherein the first communication validation information comprises a portion of the corresponding communication validation information;
embed, using one or more tonal bits of an audio communication corresponding to the event processing request, the first communication validation information, wherein embedding the first communication validation information generates a secure event communication; and
send the secure event communication to a recipient user device, wherein the recipient user device is configured to verify the secure event communication based on the first communication validation information, and wherein configuring the recipient user device comprises:
   sending, to the recipient user device, the first communication validation information and a location, within the secure event communication, of the first communication validation information, wherein the recipient user device is configured to verify the secure event communication by identifying, at the location and within the secure event communication, the first communication validation information.

2. The computing platform of claim 1, wherein the first communication validation information comprises one of: a piece of a song, an audio tone, an audio note, an audio pitch, or a sound.

3. The computing platform of claim 1, wherein embedding the first communication validation information comprises embedding, using one or more of: an audible frequency of the secure event communication or an inaudible frequency of the secure event communication, the first communication validation information.

4. The computing platform of claim 1, wherein embedding the first communication validation information comprises embedding, across a plurality of frequencies of the secure event communication and using frequency domain multiplexing, the first communication validation information.

5. The computing platform of claim 1, wherein embedding the first communication validation information comprises embedding, at different times throughout a duration of the secure event communication and using time domain multiplexing, the first communication validation information.

6. The computing platform of claim 1, wherein the memory stores additional computer-readable instructions that, when executed by the at least one processor, further cause the computing platform to:
   encrypt the secure event communication prior to sending the secure event communication to the recipient user device.

7. The computing platform of claim 1, wherein sending the secure event communication to the recipient user device comprises sending the secure event communication to the recipient user device via at least one intermediary waypoint.

8. The computing platform of claim 7, wherein the at least one intermediary waypoint is configured to modify the secure event communication, wherein modifying the secure event communication comprises one or more of:
   modifying the first communication validation information,
   modifying a location of the first communication validation information within the secure event communication, wherein the location comprises one or more of: a time or a frequency, and
   modifying encryption of the first communication validation information.

9. The computing platform of claim 8, wherein identifying the first communication validation information further comprising identifying the modification by the at least one intermediary waypoint.

10. The computing platform of claim 7, wherein the at least one intermediary waypoint is configured to verify the secure event communication prior to routing the secure event communication towards the recipient user device.

11. The computing platform of claim 10, wherein the at least one intermediary waypoint is configured to:
    detect interference with the secure event communication;
    identify, by inputting the interference into an interference response model, one or more response actions; and
    initiate the one or more response actions.

12. The computing platform of claim 11, wherein the interference response model is hosted at the computing platform, and wherein initiating the one or more response actions comprises initiating, in response to one or more commands from the computing platform, the one or more response actions.

13. The computing platform of claim 11, wherein the one or more response actions comprise one or more of:
    sending a notification to an initiator of the event processing request,
    modifying a path of the secure event communication to include one or more alternative intermediary waypoints,
    blocking transmission of the secure event communication, or
    generating an updated secure event communication that includes second communication validation information, wherein the second communication validation information is embedded at a different frequency and corresponds to a different level of security.

14. The computing platform of claim 7, wherein the at least one intermediary waypoint is configured to convert the secure event communication to a quick response (QR) code, and wherein the recipient user device is configured with an application configured to validate the QR code.

15. A method comprising:
    at a computing platform comprising at least one processor, a communication interface, and memory:
      training, using historical communication parameters and corresponding communication validation information, a secure communication model, wherein training the secure communication model configures the secure communication model to output communication validation information;
      receiving an event processing request;
      identifying, by inputting first communication parameters of the event processing request into the secure communication model, first communication validation information for the event processing request, wherein the secure communication model:
  compares the first communication parameters to the historical communication parameters to identify matching historical parameters,
  identifies a stored correlation between the matching historical parameters and the first communication validation information, wherein the first communication validation information comprises a portion of the corresponding communication validation information;
embedding, using one or more tonal bits of an audio communication corresponding to the event processing request, the first communication validation information, wherein embedding the first communication validation information generates a secure event communication; and
sending the secure event communication to a recipient user device, wherein the recipient user device is configured to verify the secure event communication based on the first communication validation information, and wherein configuring the recipient user device comprises:
  sending, to the recipient user device, the first communication validation information and a location, within the secure event communication, of the first communication validation information, wherein the recipient user device is configured to verify the secure event communication by identifying, at the location and within the secure event communication, the first communication validation information.

16. The method of claim 15, wherein the first communication validation information comprises one of: a piece of a song, an audio tone, an audio note, an audio pitch, or a sound.

17. The method of claim 15, wherein embedding the first communication validation information comprises embedding, using one or more of: an audible frequency of the secure event communication or an inaudible frequency of the secure event communication, the first communication validation information.

18. The method of claim 15, wherein embedding the first communication validation information comprises embedding, across a plurality of frequencies of the secure event communication and using frequency domain multiplexing, the first communication validation information.

19. One or more non-transitory computer-readable media storing instructions that, when executed by a computing platform comprising at least one processor, a communication interface, and memory, cause the computing platform to:
  train, using historical communication parameters and corresponding communication validation information, a secure communication model, wherein training the secure communication model configures the secure communication model to output communication validation information;
  receive an event processing request;
  identify, by inputting first communication parameters of the event processing request into the secure communication model, first communication validation information for the event processing request, wherein the secure communication model:
    compares the first communication parameters to the historical communication parameters to identify matching historical parameters,
    identifies a stored correlation between the matching historical parameters and the first communication validation information, wherein the first communication validation information comprises a portion of the corresponding communication validation information;
  embed, using one or more tonal bits of an audio communication corresponding to the event processing request, the first communication validation information, wherein embedding the first communication validation information generates a secure event communication; and
  send the secure event communication to a recipient user device, wherein the recipient user device is configured to verify the secure event communication based on the first communication validation information, and wherein configuring the recipient user device comprises:
    sending, to the recipient user device, the first communication validation information and a location, within the secure event communication, of the first communication validation information, wherein the recipient user device is configured to verify the secure event communication by identifying, at the location and within the secure event communication, the first communication validation information.

* * * * *